Aug. 14, 1945.   H. L. CARPENTER   2,382,858
CONTAINER
Filed Feb. 1, 1937    3 Sheets-Sheet 1
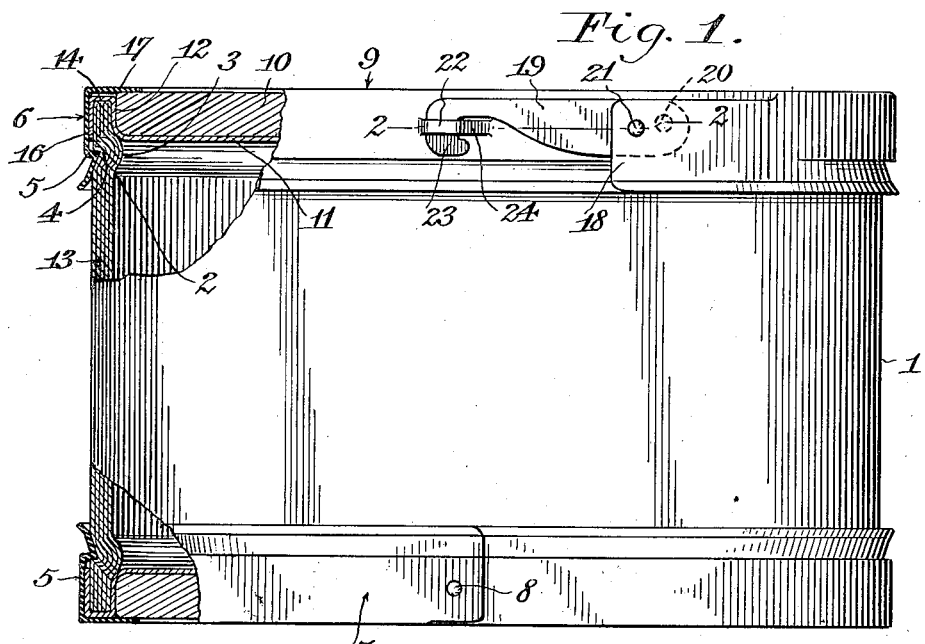
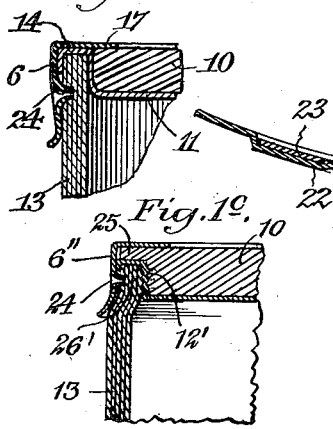
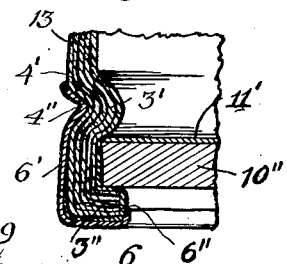
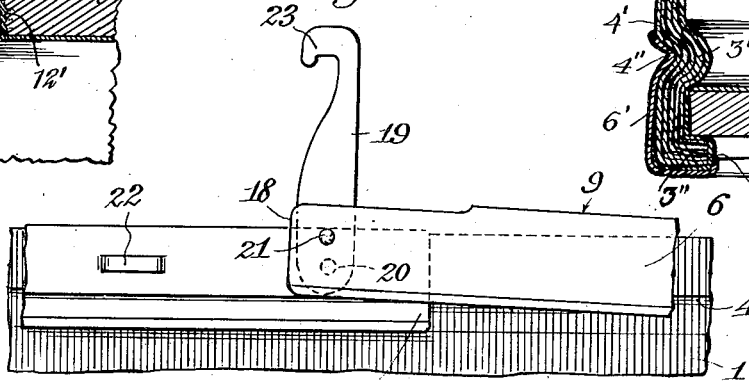
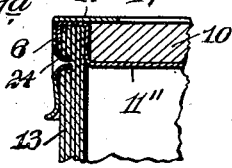
INVENTOR
Herbert L. Carpenter
BY
ATTORNEYS
WITNESSES

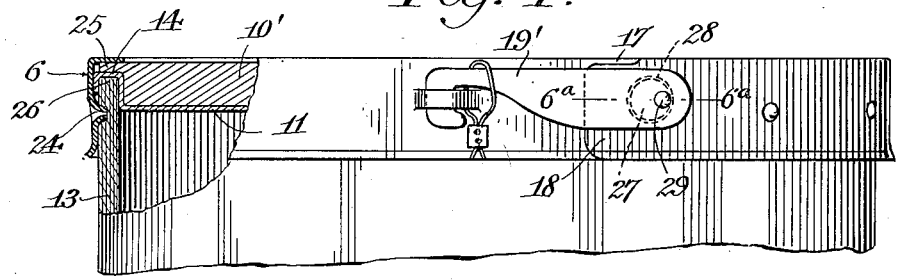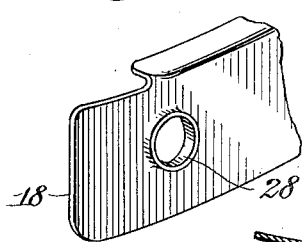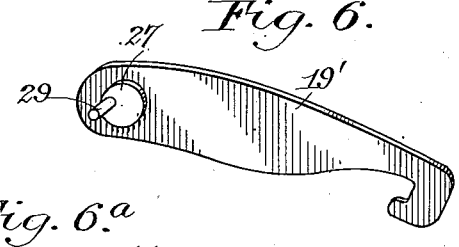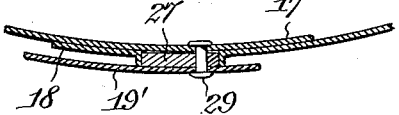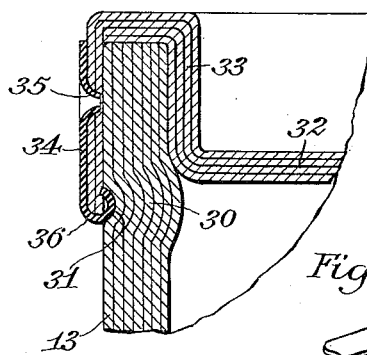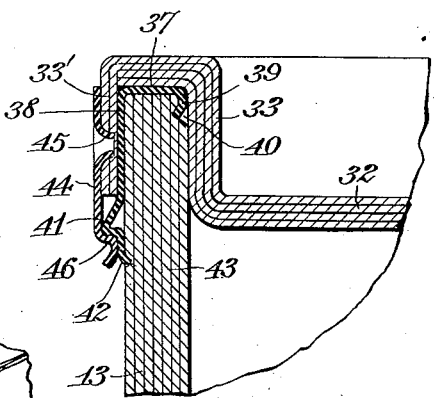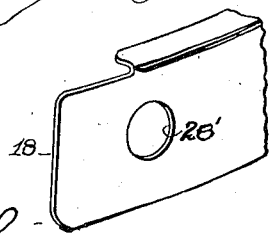

Aug. 14, 1945.    H. L. CARPENTER    2,382,858
CONTAINER
Filed Feb. 1, 1937    3 Sheets-Sheet 3
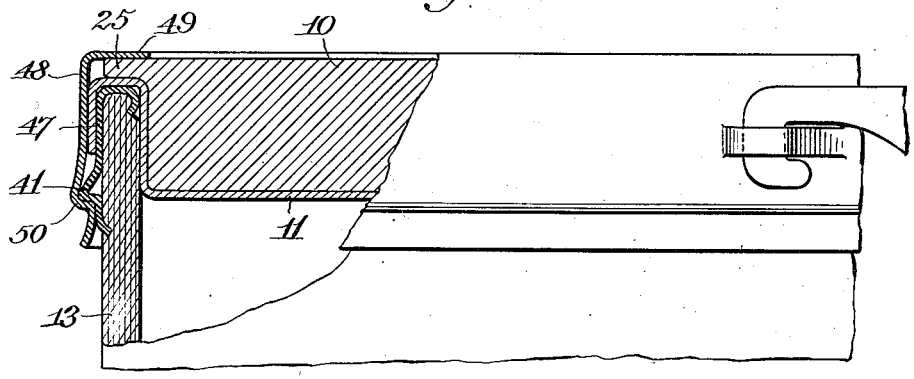
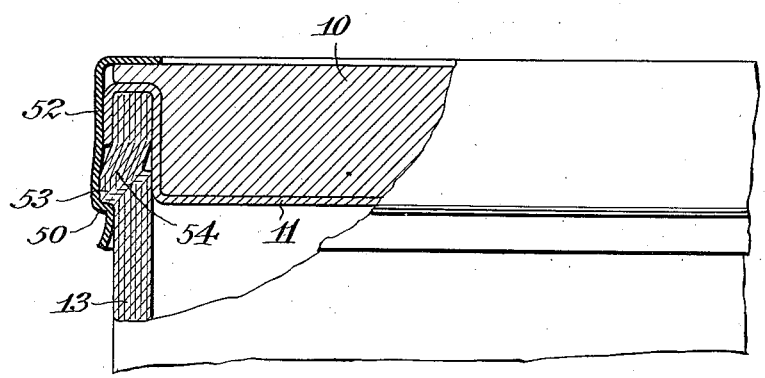
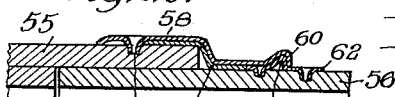
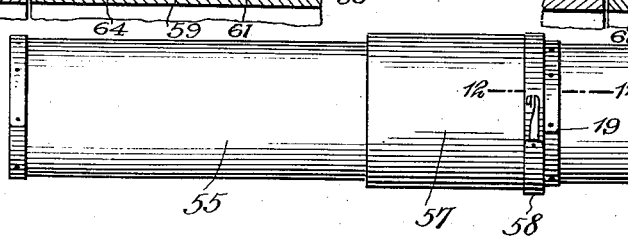
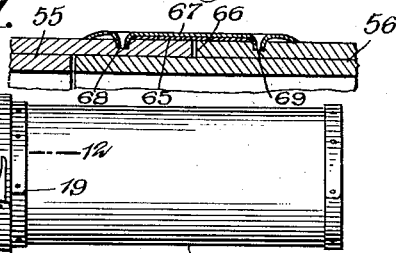
WITNESSES
Chris Peinle.
A. L. Kitchin.
INVENTOR
Herbert L. Carpenter.
BY
Munn, Anderson & Liddy
ATTORNEYS Patented Aug. 14, 1945

2,382,858

UNITED STATES PATENT OFFICE 2,382,858

CONTAINER

Herbert L. Carpenter, Brooklyn, N. Y., assignor to Carpenter Container Corporation, Brooklyn, N. Y., a corporation of Delaware Application February 1, 1937, Serial No. 123,414

13 Claims. (Cl. 229—5.7)

This invention relates to containers, and particularly to an improved container which may be formed principally of fiber, or material having substantially the characteristics of fiber.

An object of the invention is to provide a container having a removable closure including a readily expansible and contractible clamping rim or ring.

Another object of the invention is to provide a container having its walls of fiber and formed with an annular groove adjacent one end for the reception of a projection from a clamping ring.

An additional object of the invention is to provide a fiber container having a removable closure so formed as to present an extremely strong construction which will resist inward pressure and outward pressure.

An additional object, more specifically, is to provide a container with a closure having a clamping ring formed to expand and contract and provided with a locking lever capable of being manipulated to expand and contract the rim as it is applied or removed.

An additional object is to provide a container having a fiber body with a pair of end closures, one of which is removable and formed with a sealing sheet that acts in the capacity of sealing the closure, supporting the closure against inward movement, and as means for tightening the closure.

Another object is the provision of an expanding split rim for a container and means for contracting and extending the rim to secure the double function of enlarging the rim to apply the same and contracting the rim to clamp and squeeze the container and the closure head therefor.

A still further object is the provision of a container which may be divided in the center and then fitted together and provided with a clamping and securing structure for connecting together the slipped-over portions of the container.

In the accompanying drawings:

Fig. 1 is a side view of a container disclosing an embodiment of the invention, certain parts being broken away for better disclosing the construction;

Fig. 1ª is a detail fragmentary sectional view showing a slightly modified structure to that illustrated in the upper part of Fig. 1;

Fig. 1ᵇ is a detail fragmentary sectional view showing a modified form of the lower structure of the container illustrated in Fig. 1;

Fig. 1ᶜ is a detail fragmentary sectional view similar to Fig. 1ᵃ but showing a slightly modified construction;

Fig. 1ᵈ is a view similar to Fig. 1ᵃ except that it discloses a thin sheet metal sealing and supporting structure;

Fig. 2 is an enlarged fragmentary sectional view through Fig. 1 approximately on the line 2—2;

Fig. 3 is an elevation of the upper central part of the structure shown in Fig. 1, the same being on an enlarged scale and showing the clamping band or rim expanded;

Fig. 4 is a view similar to the upper part of Fig. 1, but disclosing a modified construction;

Fig. 5 is a fragmentary perspective view of one end of the rim shown in Fig. 4, the same being illustrated on an enlarged scale;

Fig. 5ª is a view similar to Fig. 5, but showing a modified construction;

Fig. 6 is an enlarged perspective view of the locking lever shown in Fig. 4;

Fig. 6ª is an enlarged fragmentary sectional view through Fig. 4, the same being taken on the line 6ª—6ª;

Fig. 7 is a fragmentary sectional view showing a further modified form of the invention to that shown in Fig. 4;

Fig. 8 is a view similar to Fig. 7 but showing an added modified form of the invention;

Fig. 9 is a view similar to Fig. 4 but showing an additional modified form of the invention;

Fig. 10 is a view similar to Fig. 9 but showing a modified structure;

Fig. 11 is a side view of the complete container disclosing an additional modified construction;

Fig. 12 is a sectional view through Fig. 11 on the line 12—12;

Fig. 13 is a view similar to Fig. 12 but showing a modified structure.

Referring to the accompanying drawings by numerals, 1 indicates the body of the container which may be formed of laminated fiber sheets or other materials making a strong body portion. The formation of this container is well known. During the formation of the body 1, comparatively thin sheets of fiber are wound to form as many plies as desired and adhesive is applied at or before the winding operation. Where an exceedingly strong container is desired, a large number of layers are used, but where a light container is to be made only a few layers are used.

In case the adhesive is allowed to dry, it is impossible to form the body portion with the inturned bead and external recess shown in Fig. 1 without breaking the fiber. In order to secure the results shown in Fig. 1 and also the other figures of the drawings, the container is taken before the adhesive dries and is subjected to rollers or pressing devices for shaping the wall as desired. Preferably hot rollers are used which are passed one or more times around the container to secure the desired shape, namely, the desired depth of the respective grooves shown in Fig. 1 or the other figures of the drawings. Fiber as used in laminated containers is usually waterproofed, which leaves the fiber highly water resisting, except when under some considerable pressure. With the wet adhesive between the laminations, the introduction of pressure by rollers forces the moist adhesives into the fiber which softens it and permits the forming of grooves, beads, and the like without fracturing the fiber itself. After the desired groove or other formation is provided, the adhesive is allowed to dry and harden, whereupon the parts so formed will be relatively strong and also fixed against slipping back to their original shape.

As shown in Fig. 1, the wall has been deformed or provided with a pressed-up portion 2 which results in an interior bead 3 and an exterior groove 4. This construction may be provided by moistening the zone indicated and then passing a roller around the wall and pressing the same inwardly at the same time. Usually three or four turns around the wall are sufficient to secure the desired deforming or pressing-up of the part. This method of forming a groove or bead is important in that it provides means for the annular shoulder or bead 5 or the rim 6 to interlock with the wall of body 1. It will be, of course, understood that the parts could be deformed outwardly as shown in Fig. 10 as well as inwardly as shown in Fig. 1.

In forming containers of fiber or other material having substantially the characteristics of fiber it is desired to provide a bottom structure 7 which may be similar to the top structure as shown in Fig. 1, or may be a different construction. However, as shown in Fig. 1 the bottom structure 7 utilizes a groove 4 and the same band 5 as the top structure, except that the band is riveted together by a suitable rivet 8 at the factory, and consequently is correctly positioned so that it will remain in place at all times. The closure structure 9, however, at the top is shipped to a manufacturer of goods removed from the body 1 in order that the manufacturer may fill the container. After the manufacturer has placed the desired goods in the body 1, he applies the closure structure 9, and then the filled container is ready to be sold or stored. In providing the closure structure 9 it is desired to present a structure which will resist pressure from the outside inwardly, and also resist pressure from the inside outwardly. It is also desired not only to present a strong closure structure but one which is sealed so that odors can not enter or can not leave the container and also one wherein the container is sealed against leakage of moisture, oil, gases, etc.

As shown in Fig. 1, there is provided a head 10 which is formed of wood, but if desired it could be formed of other material, as for instance Bakelite, fibrous material or a composition pressed into the desired shape. The head 10 is forced into the end of the body 1 and is held therein by the rim 6. A sealing sheet 11 is provided. This sealing sheet may be paper or other sealing material properly treated and extends across over the under surface of head 10, then upwardly at 12 between the periphery of head 10 and the wall 13 of body 1. After extending upwardly at point 12, the sealing member extends across the end edge 14 of wall 13 and then downwardly on the outside of wall 13 for a short distance. The rim or band 6 fits tightly against the portion 16 of the sealing member and also has a flange or part 17 extending over the peripheral part of head 10 so as to hold or lock the head in position.

Band or rim 6 is preferably made of metal, as for instance sheet steel, and is formed expansible and contractible or constrictible. This rim is divided at one point and arranged so that the portions or end members 17 and 18 overlap. A locking plate or locking lever 19 has one end extending between the overlapped ends 18 (Fig. 2) and is secured to these respective ends by the respective rotatable rivets 20 and 21. As shown in Fig. 1, the rivet 20 is offset upwardly a short distance from rivet 21 so that when the lever 19 is in the position shown in Fig. 1 the parts have moved past dead center. This will automatically lock the lever against opening and when moved to this position will draw the overlapped ends to a further overlapped position so as to constrict or reduce the diameter of the rim 6 so that it will tightly clamp or squeeze the body 1 as the bead or shoulder 5 interlocks with the wall 13 in groove 4. Rim 6 is also provided with a pressed-out part or loop 22 for receiving the hook end 23 of lever 19.

After the hook end 23 has been moved to the position shown in Fig. 1, the portion 24 of loop 22 is struck with a hammer or other object and is mashed or pressed inwardly. This will prevent hook 23 from moving out of its interlocked position until the part 24 has been raised or the loop 22 broken. When the lever 19 is moved to a position extending substantially at right angles to the ring 6, said ring will be expanded so that it may be readily forced over the end of body 1. After this has been done the lever is swung to the position shown in Fig. 1, and such movement of the lever will constrict or contract the rim until it tightly grips the body 1. It will therefore be readily seen that any one may quickly and accurately apply the closure structure 9 and also may quickly remove the same whenever desired.

In Fig. 1ᵃ a modified structure is disclosed which is identical with the structure shown in Fig. 1, except that the rim or band 6 is provided with a number of circumferentially spaced spurs 24 which are punched inwardly so that whenever the lever 19 constricts the band 6, these spurs will be forced into the wall 13 and thereby lock the band in place on the container.

Referring particularly to Fig. 1ᵇ, it will be observed that the same discloses the bottom secured in place through the use of inwardly protruding portions of the wall 13. The bottom or end 10″ may be made of wood, a composition of matter, or any desired material but of some appreciable thickness. A bottom seal 11′ of fiber or other material is used and extends across the top of the bottom 10″ along the edge and then around to the exterior of the wall 3. In this form of securing a bottom in place it will be observed that the wall 3 is provided with an inwardly extending projection or bead 3′ and a flange 3″ which is bent over and around the bottom 10″ after the bottom has been fitted into place. At the same time that the wall 3 is operated on to produce members 3' and 3", a metal band 6' is also bent into the shape shown in Fig. 1 wherein a portion thereof fits into the notch 4' and a portion fits around or over the flange 3". This provides an extra strengthening structure which automatically holds itself in place as the end 6" is turned in somewhat so that it coacts with the portion 4" to hold the band 6' in place and to thereby present a reinforcing and holding structure in addition to the members 3' and 3". This construction can be made only at the factory where the container is constructed, but the top closure may be readily applied and removed at any place.

Fig. 1c shows a construction used with the top closure and is a slightly modified construction to that shown in Fig. 1a. In this form of the invention the portion 12' of the seal 11 is pressed into the closure member or head 10 to present a better sealing action. It will be noted that the flange 25 is comparatively narrow and therefore is not of great strength. The sealing member 11 assists in supporting the head 10 against inward movement, and in addition the rim or clamping band 6' is so constricted as to deform inwardly slightly the portion 26' at the time the spur 24 is forced into the wall 13. In producing the head 10 in quantities and also in producing the other parts, it has been found that sometimes the head 10 is more or less loose and to take care of this the band 6' is such as to squeeze the parts as shown in Fig. 1c, thus presenting an efficient clamp for causing a proper support to the head 10 as well as means for preventing the removal of head 10. Band 6 is of substantially the same structure as shown in Fig. 1a and may be provided with the lever 19 or other constricting structure.

In Fig. 1d a view similar to Fig. 1a is shown, but instead of using a fiber sealing member 11 a sheet metal sealing member 11" is provided. This member is preferably a very thin sheet of steel pressed into the desired shape and acts in the double capacity of a seal and means for supporting the head 10.

In Fig. 4 another modified form of the invention is shown, in which the band 6 is the same as shown in Fig. 1a, except for the arrangement of the lever 19' and associated parts, and also except that the head 10' is provided with a flange 25. The head 10' may be made from wood or other material and is provided with a radiating flange 25 which rests on the end edge 26 of wall 13, unless the seal 11 is used, and when this seal is used flange 25 rests on the section 14 of this seal. Incidentally, this seal not only provides a seal but also a filling and strengthening structure for filling the space between the head 10' and the wall 13, whereby there will be a very tight accurate fit.

In this form of the invention there are provided a number of spurs 24 as shown in Fig. 1a. Instead of using the lever 19 and associated levers as shown in Fig. 1, lever 19' is provided with a disk-shaped eccentric 27 which is welded or otherwise rigidly secured to the lever as shown in Fig. 6. The end 18 of the band 6 is provided with a hollow circular boss 28 as shown in Fig. 5, and the disk 27 is rotatably fitted into this boss. A rotatable rivet 29 extends through lever 19', disk 27, and through the end 17. It will be noted that in this form of the invention the lever 19' is on the outside surface of the end 18, but if desired it could be arranged between the overlapped ends 17 and 18. By swinging this lever back and forth the band may be enlarged or constricted.

Also it will be evident that the disk 27 and associated parts could be used with the bead 5 and associated parts shown in Fig. 1.

Fig. 7 shows another form of the invention, wherein the wall 13 is provided with a pressed-up portion 30 presenting a groove 31 on the outside and a head or end member 32 is provided in this form of the invention and is formed with an annular U-shaped peripheral member 33 which fits over or straddles the upper end portion of wall 13. Preferably there are less laminations of member 33 exteriorly of the wall 3 than interiorly, as shown in my former Patent No. 2,056,956, whereby there will be presented not only a good closure but a brace to prevent collapsing of the container. In this form of the invention the band 34 is not provided with a flange similar to flange 17, although a flange could be used. However, as shown in Fig. 7, the flange is eliminated and spaced spurs 35 are provided which are forced into the outer part of member 33, while the curled lower end of band 34 fits into the groove 31. It will be understood that the band 34 could use either lever 19 or 19' and associated parts to produce a contraction and an expansion.

In Fig. 8 head 32 is similar to that shown in Fig. 7 and the U-shaped part 33 rests on the section 37 of a metal ring 38. Section 37 is turned over at 39 so as to be forced into the annular notch 40, while the lower part of the band is formed with a shoulder 41 and a pressed-in edge 42 fitting into an annular notch 43 in wall 13. In this form of the invention the outer portion 33' of member 33 overlaps the ring 38 so that the clamping band 44 presses the spurs 45 into the portion or part 33' instead of the wall 13. Also the band 44 is provided with a shoulder or band portion 46 which interlocks with the shoulder 41 for holding the band in place.

In Fig. 9 the wall 13 is provided with a ring 47 which is identical in structure with ring 38 shown in Fig. 8. However, instead of having a U-shaped member 33, there is provided a seal 11 in this form of the invention, and a head 10 with a flange 25. The band or rim 48 is provided with a flange 49 overlapping the flange 25, and with a shoulder 50 interlocking with the shoulder 41 of ring 47.

In Fig. 10 there is presented a head 10, a sealing member 11, and a band 52 which is similar to band 48, but the shoulder 50 interlocks with the shoulder formed by the bead 53 resulting from forming a pressed-out portion 54. In connection with the pressed-out portions 2, 30 and 54, it is desired to point out that the fiber is still moist and formable at this point and then pressed, preferably with a hot roller. There is a certain time element necessary in performing this operation in order that the moisture may penetrate either by capillary attraction or by being forced into the fiber by the roller or other pressing member. In the forms shown in Figs. 1 and 7, the fibers have been pressed inwardly so that there will be presented an inner bead and an outer groove, while the showing in Fig. 10 illustrates the groove as being arranged interiorly and is really idle, while the bead forming shoulder 53 protrudes outwardly.

The seal 11 or any of the other forms of seals do not only perform a new function in tightening the head but presents a strong supplemental supporting member having at its periphery a U-shaped structure in cross section. This structure results in presenting a support in addition to sealing and tightening the closure head against pressure from the outside inwardly. Where the flanged head is shown as in Figs. 9 and 10, the seal or supplementary head 11 reinforces the flange 24 from outward pressure. It is to be known that the flange 25 is relatively weak as a supporting member and might break under pressure and allow the head to move into the container, but with the supplementary member 11 clamped in place it actually holds the head against inward movement as member 11 would have to be broken before the head could be forced into the container.

In forming all of the containers it is evident that they may be made of any desired length and size, but for some purposes a specially long container is desirable, as for instance a container for blueprints, linoleum, or other rolled goods. When a container of this kind is desired, the structure shown in Fig. 11 is provided. This structure includes a section 55 and a section 56 formed similar to body 1 with its bottom closure 7. Section 55, however, is provided with an enlarged section 57 into which the open end of section 56 extends. The band 58 acts to clamp these two sections together so that the container will be properly sealed and the contents protected.

In Fig. 12 will be seen a section through Fig. 11 showing the arrangement of the clamping ring 58 in connection with the sections 55 and 56. From Fig. 12 it will be observed that the section 56 telescopes a short distance within section 55 and a sealing strip 59 of fiber or other material overlaps both of these sections beneath the clamp 58. The clamp 58 is provided with an annular groove 60 fitting over the shoulder 61 formed in the metal piece 62 which is preferably held in place by suitable spurs 63. Any number of spurs 64 are adapted to hold the opposite edge of band 8 to the section 55. This band is divided at one point and is distended and constricted by lever 19 in a similar way to that illustrated in Fig. 1.

As a modified structure to that illustrated in Figs. 11 and 12, Fig. 13 shows how the sections 55 and 56 may be joined so as to present a smooth continuous surface. A sealing member 65 of fiber or other material may be used to seal the joint 66. A contracting band 67 having a number of spurs 68 and 69 connects the two sections 55 and 56 together. Band 67 is provided with a lever 19 as shown in Fig. 1, so as to contract and expand the same. It will also be understood that the band 67 is divided in a similar manner to the band 9 shown in Fig. 1.

As shown in Fig. 5ª, there is provided an aperture 28' which is circular. The flange or boss 28 is eliminated in this form of the invention which is adapted to receive the disk 27 and function with the lever 19' in a similar way to the structure illustrated in Fig. 4.

I claim:

1. A rim for containers comprising an expansible band of material having overlapping ends, a locking lever having one end extending between said overlapping ends, a rivet pivotally connecting said lever to one of said overlapping ends, a second rivet pivotally connecting said lever to the other of said overlapping ends, said rivets being spaced apart and one being offset toward the edge of the rim when the lever is positioned to extend substantially parallel with the rim, and coacting means carried by said rim and said lever for locking the lever against swinging movement.

2. An expansible rim for containers comprising a band of material having overlapping ends one of said ends having a pressed-out loop, a locking lever having one end extending beneath said overlapping ends, a pair of spaced pivotal rivets, one rivet connecting the end of said lever to one of said overlapping ends and the other rivet connecting said lever with the other of said overlapping ends, and means at the front end of said lever adapted to interlock with said loop for disengageably locking the lever in functioning position.

3. A circumferentially expansible rim for containers comprising a band divided at one point having the ends continually overlapping, means acting against the outer surface of a container for holding the band interlocked with the container, a swinging lever, and a rotatable cam and pin carried by said lever adjacent said point, said cam being fitted rotatably in one of said overlapping ends and said pin being rotatably fitted in the other of said overlapping ends whereby when said lever is swung to functioning position said band will be constricted for squeezing said container.

4. A container and closure structure comprising a hollow body formed of fiber, a head fitting in the end of said container for closing the same, a rim encircling said body near said end, said rim having a number of spurs pressed therefrom projecting into said body for holding the rim in place in the container, and a locking structure for constricting and holding in place said rim, the constriction of said rim causing said spurs to enter the walls of said body.

5. A container and closure structure comprising a hollow body of fiber, a head fitted into the end portion of said body for closing the same, a rim surrounding said body in the plane of said head, said rim having a plurality of spaced spurs extending toward said body, said rim being divided at one point with the parts adjacent said point being overlapped, a lever having one end extending between the overlapped parts of said rim, a pair of circumferentially spaced rotatable rivets extending through said lever, one of said rivets extending through one of said overlapped portions and the other rivet extending through the other overlapped portion, whereby when said lever is swung to a position at right angle to said rim, said rim will be expanded, and when swung to a position substantially parallel thereto, said rim will be contracted and said spurs forced into the walls of said body.

6. A container and closure structure comprising a hollow body of fiber, a head fitted into one end of said body for closing the same, a sealing and filling member extending across the top edge of said container and between the container and said head, a rim substantially L-shaped in cross-section positioned to surround the container in the zone of said head and overlap the end edge of the container and part of said head, said rim being provided with inwardly extending spurs, and a locking structure for said rim, said locking structure being formed with means for constricting said rim when moved to a locked position to cause said spurs to enter the walls of said body.

7. A container structure comprising a body portion made of fibre board or the like, said body portion being bent inwardly adjacent one end thereof to form an inwardly extending rib and an external groove which are spaced from the end of said body portion, a head for closing said end of said body portion, said head having a portion supported on said rib and a flange extending outwardly into overlapping relation with the end of said body portion, and a split clamping ring which embraces the end of said body portion with its inner portion projecting into the external groove of said body portion and with its outer portion projecting into overlapping relation to the said flange of said barrel head.

8. A container structure comprising a body portion made of fiber board or the like, said body portion being bent inwardly adjacent one end thereof to form an inwardly extending rib and an upstanding flange thereabove and also to form an external groove in alignment with said rib, a head for closing said end of said body portion, said head having a portion overlapping said upstanding flange and having a portion merely resting on said rib and being removable, and a split clamping ring which embraces the end of said body portion and having its inner end projecting into said external groove and having its outer portion overlapping said head whereby the said head is clamped between said clamping ring and said inwardly extending rib.

9. A container structure comprising a body portion made of fibre board or the like, said body portion being bent to form an inwardly extending rib adjacent the end thereof and an external groove in alignment therewith, a removable closure comprising a head for closing the end of said body portion, said head being disposed in the end of said body portion at a point outside said rib and resting on said rib, said head comprising a body portion of heavy non-metallic material which has a sealing member of flexible non-metallic material disposed over one surface thereof and a removable split metal ring which engages said head and overlaps the heavy body portion of said head and which has a portion extending into said external groove so as to clamp the head in position on said rib, said sealing member extending outwardly beyond the body portion of said head and between said metal ring and the body portion of the container and being clamped therebetween.

10. A container and closure structure comprising a hollow body of fibre, a head for closing the end portion of the body, a rim surrounding said body in the plane of said head, said rim having means for interlocking engagement with the body and said rim being divided at one point with the two ends disposed in overlapping relationship, a locking lever having one end extending between the overlapped ends of the rim, a pair of circumferentially spaced pivotal connections extending through said locking lever, one of said connections extending through one end of the rim and the other connection extending through the other end of the rim whereby when said lever is swung to a position at right angles to said rim said rim will be expanded and when swung to a position substantially parallel thereto, said rim will be contracted and said interlocking means on the rim will be inter-engaged with the body of the container.

11. A tubular container structure comprising a body portion made of fibre board or the like, said body portion being bent inwardly adjacent one end thereof but spaced therefrom to form an inwardly extending rib and a flange projecting beyond the rib and also to form an external groove in alignment with said rib, a plug-like closure for closing the end of said body portion, said closure having a portion overlapping said flange and having a portion merely resting on said rib and being removable, and a split ring embracing the flange of said body portion and having its inner end projecting into said external groove and having its outer portion overlapping the peripheral portion of said closure whereby the closure is clamped between said ring and said inwardly extending rib.

12. A tubular container structure comprising a body portion made of fibre board or the like, said body portion being bent inwardly adjacent one end thereof but spaced therefrom to form an inwardly extending rib and a flange projecting beyond the rib and also to form an external groove in alignment with said rib, a plug-like closure for closing the end of said body portion, said closure having a portion merely resting on said rib and being removable, and a split ring embracing the flange of said body portion and having its inner end projecting into said external groove and having its outer portion overlapping the peripheral portion of said closure, said ring serving to clamp the flange into engagement with the periphery of the closure and to press the closure into engagement with the rib.

13. A rim for containers comprising an expansible band of material having overlapping ends, a locking lever having one end extending between said overlapping ends, means pivotally connecting said lever directly in face contacting relation to one of said overlapping ends, a second means pivotally connecting said lever directly in face contacting relation to the other of said overlapping ends, said two means being spaced apart and one being offset toward the edge of the rim when the lever is positioned to extend substantially parallel with the rim, and coacting means carried by said rim and said lever for locking the lever against swinging movement.

HERBERT L. CARPENTER.